United States Patent
Sankruthi

(10) Patent No.: US 8,789,185 B1
(45) Date of Patent: Jul. 22, 2014

(54) METHOD AND APPARATUS FOR MONITORING A COMPUTER SYSTEM FOR MALICIOUS SOFTWARE

(75) Inventor: Anand D. Sankruthi, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 1456 days.

(21) Appl. No.: 12/210,245

(22) Filed: Sep. 15, 2008

(51) Int. Cl.
*H04L 9/00* (2006.01)

(52) U.S. Cl.
USPC .......................................................... 726/24

(58) Field of Classification Search
USPC .......................................... 726/24; 709/224
See application file for complete search history.

(56) References Cited

U.S. PATENT DOCUMENTS

| | | | |
|---|---|---|---|
| 2007/0050461 A1* | 3/2007 | Petry et al. | 709/206 |
| 2007/0101430 A1* | 5/2007 | Raikar | 726/24 |
| 2007/0156830 A1* | 7/2007 | Petry et al. | 709/206 |
| 2010/0024034 A1* | 1/2010 | Cohen | 726/24 |

* cited by examiner

*Primary Examiner* — Matthew Smithers
(74) *Attorney, Agent, or Firm* — Wilmer Cutler Pickering Hale and Dorr LLP

(57) ABSTRACT

A method and apparatus for monitoring a computer system for malicious software is provided. The method for monitoring malicious software proliferation includes processing a deceptive contact address associated with a monitoring device and inserting the deceptive contact address into a contact list, wherein malicious software self-propagates through the contact list, wherein the monitoring device receives a copy of the malicious software through the deceptive contact address.

20 Claims, 3 Drawing Sheets

METHOD AND APPARATUS FOR MONITORING A COMPUTER SYSTEM FOR MALICIOUS SOFTWARE

BACKGROUND

1. Field of the Invention

Embodiments of the present invention generally relate to a computer system security and, more particularly, to a method and apparatus for monitoring a computer system to detect self-propagating malicious software.

2. Description of the Related Art

Malicious software programs (e.g., virus, Trojans, and the like) are designed to disrupt normal activities within a computing environment for a large organization. For example, the malicious software programs corrupt mission-critical data and/or render unusable one or more computer hardware devices. As a result, the large organization experiences a substantial loss in productivity. Furthermore, a significant amount of time and money is spent to recover any lost data. Accordingly, the malicious software programs threaten the potential growth of the large organization and affect the usability of the computing environment.

Viruses are common forms of the malicious software programs. Generally, a virus is usually an unauthorized block of an executable program (or some unit of code, e.g., instructions to which the computer responds, such as a code block, code element or code segment) that may be attached to other programs and/or files. Sometimes, the virus is received through a file attached to an email, an Instant Message (IM) and/or a similar message exchanged through communication software. Once executed, the viruses spread quickly by attaching themselves to various resources and infecting computer programs. Further, the viruses self-propagate by sending a copy of itself to each of the contacts in an address book.

The number of new viruses and variants of existing viruses is increasing at such a higher pace that it has become difficult for existing anti-virus systems to keep pace with the release of new viruses. There is a very small window of opportunity to respond to a new virus. Furthermore, conventional techniques of virus detection are unable to quickly recognize new viruses. As a result, the viruses cause unrecoverable damages to the computing environment.

Accordingly, there is a need in the art for an efficient method and apparatus for monitoring a computer system to detect and prevent new self-propagating viruses.

SUMMARY OF THE INVENTION

Embodiments of the present invention comprise a method and apparatus for monitoring a computer system for malicious software. In one embodiment, the method for monitoring malicious software proliferation comprising processing a deceptive contact address associated with a monitoring device and inserting the deceptive contact address into a contact list, wherein malicious software self-propagates through the contact list, wherein the monitoring device receives a copy of the malicious software through the deceptive contact address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
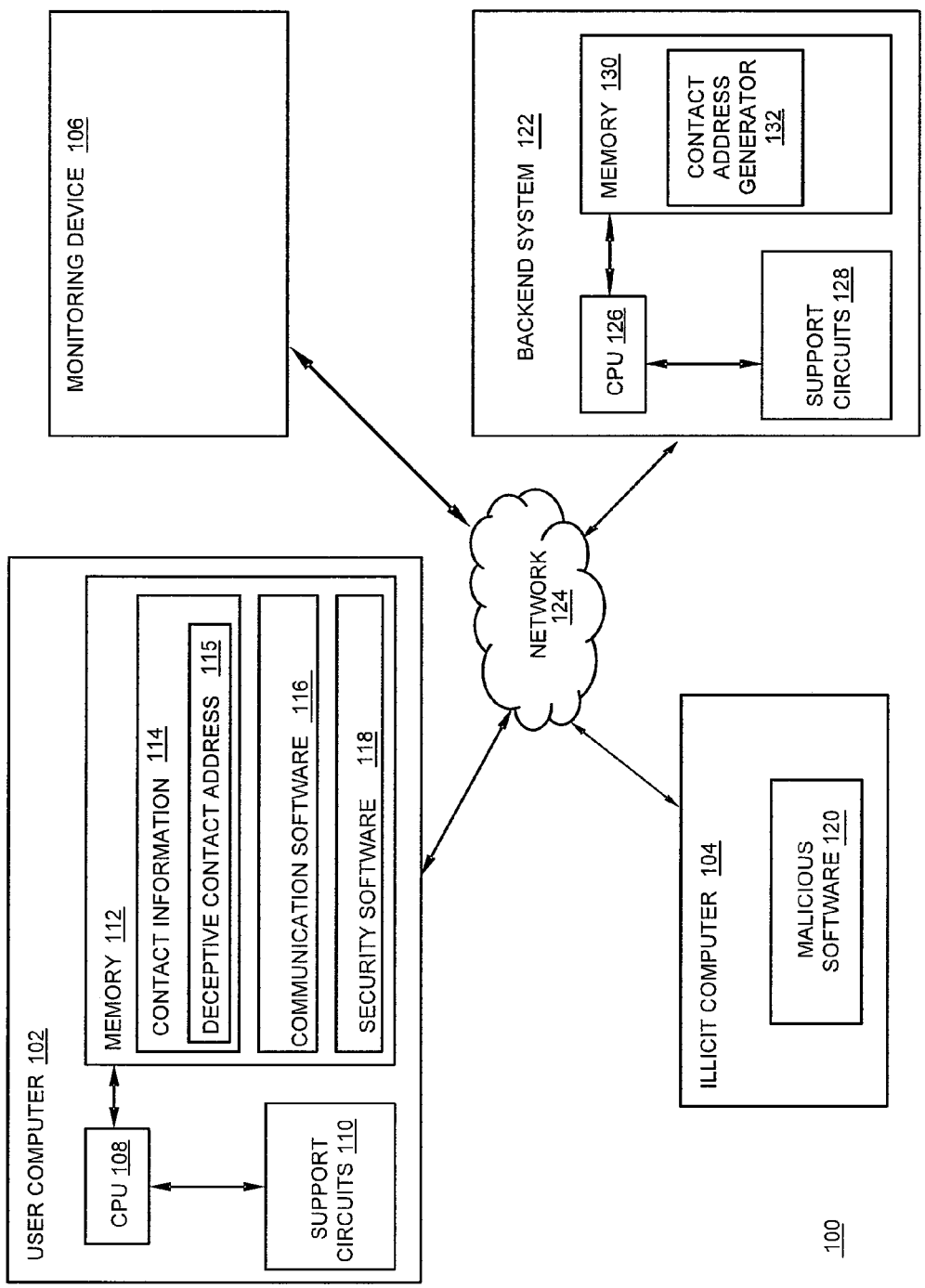
FIG. 1 is a block diagram of a system for detecting and preventing new self-propagating viruses in accordance with one or more embodiments.

FIG. 1 is a block diagram of a system 100 for detecting and preventing virus propagation in to the computer according to one embodiment of the present invention. The system 100 includes a user computer 102, an illicit computer 104, a monitoring device 106 and a backend system 122, where each is coupled to each other through a network 124. It is appreciated that the system 100 may include a plurality of user computers 102 according to various embodiments.

The user computer 102 is a type of computing device (e.g., laptop, desktop, a mobile phone, Personal Digital Assistant (PDA)), such as those generally known in the art. The user computer 102 includes a Central Processing Unit (CPU) 108, various support circuits 110, and a memory 112. The CPU 108 may comprise one or more commercially available microprocessors or microcontrollers which facilitate data processing and storage. The CPU 108 executes software stored in the memory 112. The support circuits 110 facilitate the operation of the CPU 108 and comprise at least one of clock circuits, power supplies, cache, input/output circuits, and the like. The memory 112 includes at least one of Read Only Memory (ROM), Random Access Memory (RAM), disk drive storage, optical storage, removable storage, and the like. The memory 112 further includes various data, such as contact information 114. The memory 112 further includes various software packages, such as communication software 116 and security software 118. The security software 118 may include various anti-malware security applications, such as SYMANTEC Norton Anti-Virus.

The contact information 114 may include one or more contact lists that store contact addresses of various computing devices (e.g., computers operated by friends or people associated with a user). According to an embodiment of the present invention, a deceptive contact address 115 is inserted into the one or more contact lists. For example, the deceptive contact address may be added as a new contact for Instant Messenger software (e.g., YAHOO messenger, GTalk and/or the like). The deceptive contact address 115 may include an identifier for the monitoring device 106, such as a phone number, an email address, an internet protocol (IP) address, a unique username specific to the particular communication application and/or the like).

The communication software 116 may include various communication applications, such as AOL Instant Messenger, MSN Messenger, YAHOO Messenger, MICROSOFT Outlook and/or the like. Each communication application running on the user computer 102 may use a specific contact list. As such, the user may communicate with a computing device through several contact addresses. Furthermore, each communication application may provide an interface for adding, modifying, replacing and/or deleting one or more contact addresses within the specific contact list. As an example, the interface may be a COM interface or an Application Programming Interface (API) library.

The illicit computer 104 is a computing device and a source for malicious software proliferation. The illicit computer 104 executes malicious software 120 to disrupt activities at the user computer 102. Upon execution, the malicious software 120 infects the user computer 102. In one embodiment, the malicious software 120 includes various malicious software programs (e.g., viruses, Trojans and/or the like). The illicit computer 104 may be not be aware of the malicious software 120 in that it is merely passing on an infection it has itself incurred. Further, the illicit computer 104 may be used by a hacker to spread the malicious software 120 throughout the system 100.

The monitoring device 106 is configured to detect and/or capture the malicious software 120 through the deceptive contact address 115. In one embodiment, the monitoring device 106 detects the malicious software 120 based on data received through the deceptive contact address 115. Since the deceptive contact address 115 is only used to communicate with the monitoring device 106, any data (e.g., e-mail, instant messages and/or the like) received at the monitoring device 106 is most likely associated with proliferation of the malicious software 120. In one embodiment, the monitoring device 106 communicates the received data to the backend system 122 for further analysis.

The backend system 122 is a type of computing device (e.g., a server) that includes a Central Processing Unit (CPU) 126, various support circuits 128, and a memory 130. The memory 130 includes a contact address generator 132. In one embodiment, the monitoring device 106 cooperates with the backend system 122 to analyze a copy of the malicious software 120 that is received from the user computer 102 through the deceptive contact address 115. For example, the monitoring device 106 communicates a copy of the malicious software 120 to the backend system. Then, the backend system 122 determines whether the malicious software 120 is a new, self-propagating malicious software program. For example, if a virus does not have a definition or if the security software 118 is unable to identify the virus, then the virus is most likely new and/or unknown. Accordingly, the backend system 122 may provide a definition and/or one or more signatures (e.g., code-based or activity-based signatures) through a subscription service (e.g., an update to the security software 118).

In operation, the security software 118 is configured to store the deceptive contact address 115 in the contact information 114. In one embodiment, the security software 118 uses an interface provided by the communication software 116 to perform various functions for the deceptive contact address 115. For example, the security software uses the interface to insert (i.e., add) the deceptive contact address 115 to the contact information 114. Furthermore, the security software 118 uses the interface to modify the deceptive contact address 115. In addition, the security software 118 uses the interface to replace the deceptive contact address 115 with another deceptive contact address (e.g., an email address having a different domain name).

The contact address generator 132 is configured to create the deceptive contact address 115 that is non-deterministic for the purpose of detecting the malicious software 120. In one embodiment, the deceptive contact address is used to acquire a copy of the new, self-propagating malicious software programs. In one embodiment, the deceptive contact address 115 may include a domain name that is associated with the security software 118 (e.g., a SYMANTEC domain). In one embodiment, the domain name used for the deceptive contact address 115 is changed on a periodic basis to prevent detection and ensure effectiveness. In one embodiment, the contact address generator 132 communicates the deceptive contact address to the security software 118 for storage in the contact information 114. According to an embodiment of the present invention, the deceptive contact address 115 includes an identifier (e.g., an email address, a phone number, a unique username and/or the like) which is associated with the communication software 116. As such, the security software 118 inserts the identifier into the contact information 114.

In one embodiment, the deceptive contact address 115 may include an email address that represents a location of the monitoring device 106. For example, the email address may be associated with a SYMANTEC domain. Moreover, the email address may identify a mailbox that belongs to a SYMANTEC Response group. In another embodiment, the email address may be selected at random from a plurality of email addresses that represent the location of the monitoring device 106. Furthermore, the email address is selected at random in order to remain non-deterministic and, thus, deceive the malicious software 120.

The deceptive contact address 115 may also be provided by the contact address generator 132 through a subscription service (e.g., SYMANTEC anti-virus products). In another embodiment, one or more email address may be selected (e.g., randomly) from a list of email addresses which are shipped along with the security software 118. According to an embodiment of the present invention, the deceptive contact address 115 is dynamically changed during LiveUpdate of SYMANTEC NORTON Anti-virus software to prevent hackers or the malicious software 120 from detecting the deceptive contact address 115. In other words, if the deceptive contact address 115 is changed periodically, then malicious software programmers are less likely to associate the deceptive contact address 115 with the monitoring device 106. During the LiveUpdate, one or more new email addresses are downloaded to replace the previous email addresses. Further, a domain name used in the deceptive contact address may be changed to reduce a probability of detection by the malicious software programmers.

According to various embodiments of the present invention, a virus may be introduced into the system 100 from the illicit computer 104 via an e-mail attachment, a security breach of the firewall server, a removable media introduced by the user or in some other way. When the virus infects the user computer 102, the virus retrieves the contact information 114 and sends a copy of itself to each of the contact addresses including the deceptive contact address 115. As such, a copy the virus is sent to and captured at the monitoring device 106. Subsequently, the monitoring device 106 sends the copy of the virus to the backend system 122 for further processing.

The network 124 comprises a communication system that connects a computer system by wire, cable, fiber optic and/or wireless link facilitated by various types of well-known network elements, such as hubs, switches, routers, and the like. The network 124 may employ various well-known protocols to communicate information amongst the network resources. For example, the network 124 may be a part of the internet or intranet using various communications infrastructure such as Ethernet, WiFi, WiMax, General Packet Radio Service (GPRS), and the like.

Figure 2:
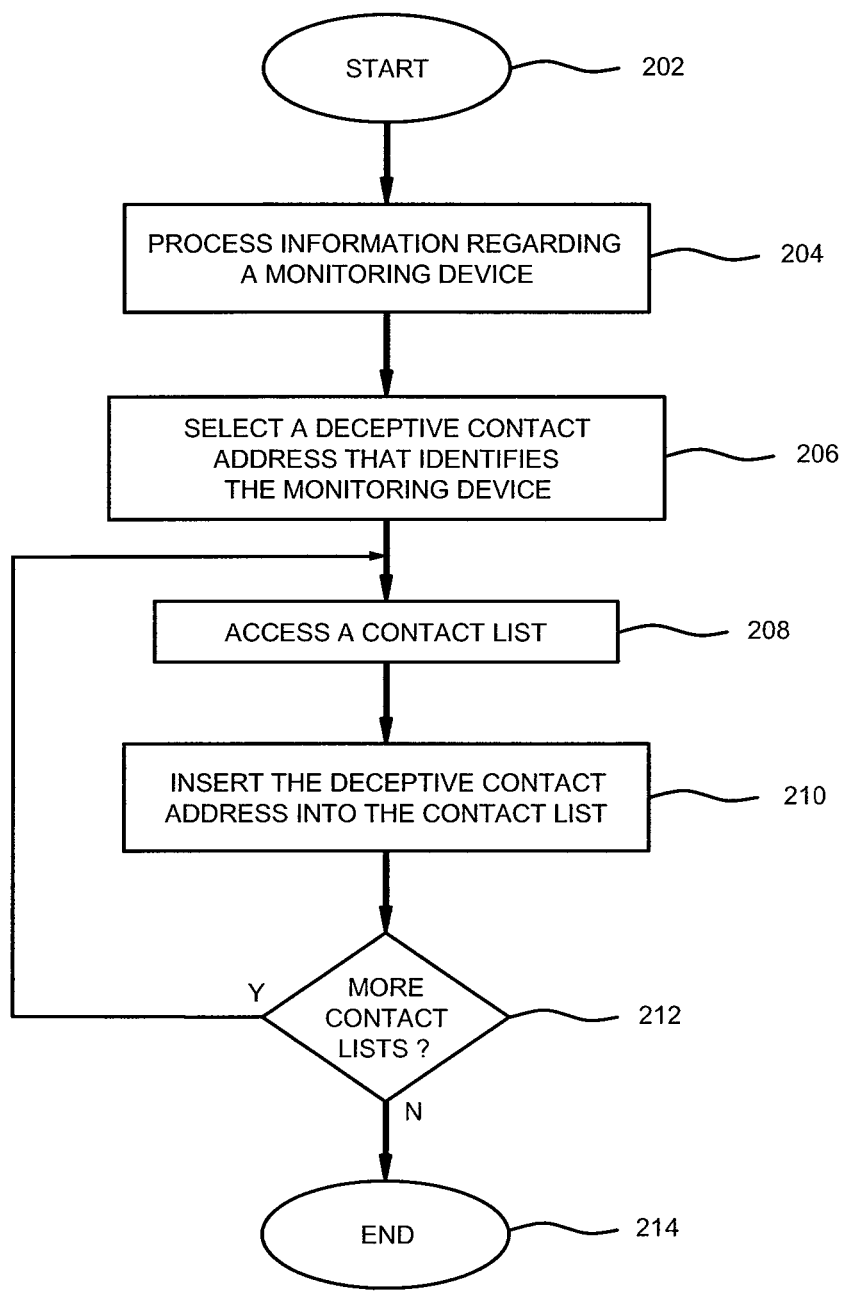
FIG. 2 is a flow diagram of a method 200 for generating a deceptive contact address in accordance with one or more embodiments.

FIG. 2 is a flow diagram of a method 200 for generating a deceptive contact address in accordance with one or more embodiments. The method 200 starts at a step 202 and proceeds to a step 204. At the step 204, information regarding a monitoring device, for example, the monitoring device 106 of the FIG. 1, is processed. According to an embodiment of the present invention, the information regarding the monitoring device includes a plurality of deceptive contact address for communicating with the monitoring devices.

At a step 206, a deceptive contact address that identifies the monitoring device 106 is selected. At a step 208, the contact list of the user in the contact information 114 is accessed. At a step 210, the deceptive contact address generated at the step 206 is inserted into the contact list. The step 210 of the method 200 further proceeds to a step 212, at which a determination is made as to whether more contact lists exist. If the determination is made that more contact lists exist (Option "YES"), then the step 212 returns to the step 208. If the determination is made that no more contact lists exist (Option "NO"), then the step 212 ends at a step 214. At step 214, the method 200 ends.

Figure 3:
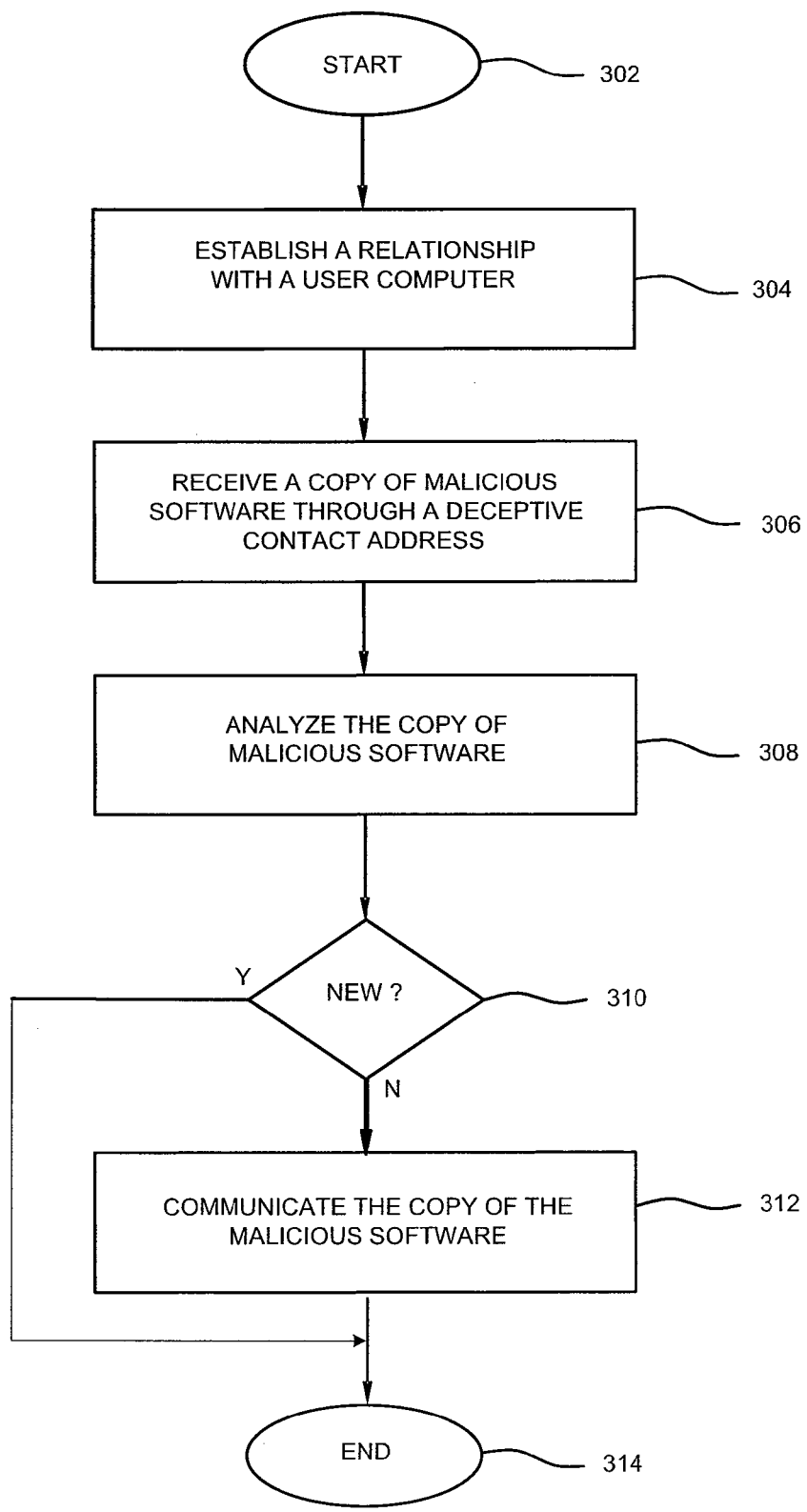
FIG. 3 is a flow diagram of a method 300 for monitoring a computer system using deceptive contact address in accordance with one or more embodiments.

FIG. 3 is a flow diagram of a method 300 for monitoring a computer system to detect and prevent new, self-propagating malicious software, according to an embodiment of the present invention. The method 300 starts at a step 302 and proceeds to a step 304. At the step 304, a relationship with a user computer is established. In one embodiment, the user computer and a monitoring device are able to communicated data through a similar communication application.

At a step 306, a copy of the malicious software is received through the deceptive contact address. At a step 308, the copy of malicious software is analyzed. The analysis of the malicious software may be performed at a back-end server according to one embodiment. At step 310, a determination is made as to whether the malicious software is new. If it is determined that the malicious software program is new, then the method 300 proceeds to step 312. At step 312, the copy of the malicious software is communicated. For example, the copy of the malicious software may be communicated to a facility where signatures are to be created to prevent the proliferation of the malicious software. If it is determined that the malicious software program is not new, then the method 300 proceeds to step 314. The step 308 of the method 300 proceeds to step 314 where the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for monitoring malicious software proliferation, comprising:
   processing a deceptive contact address associated with a first network domain of a monitoring device;
   inserting the deceptive contact address into a contact list of a system associated with a second network domain; and
   processing a copy of malicious software received at the first network domain of the monitoring device from the second network domain through the deceptive contact address, wherein the malicious software self-propagates through the contact list, and wherein the first and second network domains are different.

2. The method of claim 1 further comprising analyzing the malicious software to determine that the malicious software is new.

3. The method of claim 1, wherein the deceptive contact address is non-deterministic.

4. The method of claim 1, wherein the deceptive contact address defines an identifier associated with communication software, wherein the identifier comprises at least one of an email address, a phone number, a username, or an internet protocol (IP) address.

5. The method of claim 4, wherein inserting the deceptive contact address further comprises inserting the identifier into the contact list through an interface that is provided by the communication application.

6. The method of claim 1, wherein processing the deceptive contact address further comprises generating the deceptive contact address using information that identifies the monitoring device.

7. The method of claim 1, wherein processing the deceptive contact address further comprises selecting an email address that is randomly generated.

8. The method of claim 1 further comprising modifying the deceptive contact address that is inserted into the contact information.

9. A method for monitoring malicious software proliferation, comprising:
   storing an email address in a contact list of a system associated with a second network domain for communicating with a monitoring device, wherein the email address is associated with a first network domain of the monitoring device, wherein the first and second network domains are different; and
   when malicious software uses the contact list to propagate, sending a copy of the malicious software from the second network domain to the monitoring device at the first network domain using the email address.

10. The method of claim 9, wherein storing the email address further comprises selecting the email address at random from a plurality of email addresses that are associated with the network location of the monitoring device.

11. The method of claim 10 further comprising:
    selecting another email address at random from the plurality of email addresses that are associated with the network location of the monitoring device; and
    replacing the stored email address with the another email address.

12. The method of claim 9 further comprising:
    modifying a domain name used by the plurality of email addresses;
    replacing the stored email address with an email address having the modified domain name.

13. A system for monitoring malicious software proliferation, comprising:
    a user computer associated with a second network domain comprising:
        a memory comprising contact information that includes a deceptive contact address for communicating with a monitoring device, wherein the deceptive contact address is associated with a first network domain of the monitoring device, wherein the first and second domains are different; and
    a monitoring device coupled to the user computer for capturing malicious software that is sent from the second network domain to the first network domain through the deceptive contact address.

14. The system of claim 13, wherein the user computer further comprises security software for storing the deceptive contact address in the contact information.

15. The system of claim 14 further comprises a backend system coupled to the monitoring device, comprising a contact address generator for creating the deceptive contact address and communicating the deceptive contact address to the security software.

16. The system of claim 15, wherein the backend system analyzes the captured malicious software to generate security definitions.

17. The system of claim 14, wherein the security software selects the deceptive contact address at random from a plurality of deceptive contact addresses that are associated with the network location of the monitoring device.

18. The system of claim 17, wherein the security software replaces the deceptive contact address with another deceptive contact address selected from the plurality of deceptive contact addresses.

19. The system of claim 14, wherein the security software stores the deceptive contact address in the contact information through an interface that is provided by a communication application associated with the contact information.

20. The system of claim 14, wherein the security software modifies the deceptive contact address that is stored within the contact information.

\* \* \* \* \*